Dec. 11, 1962 G. E. ATKINSON 3,067,584
SEALING RING MEANS FOR RECIPROCATING PISTON USED IN
POWER-OPERATED PERCUSSIVE TOOL
Filed Feb. 15, 1962

INVENTOR
GEORGE E. ATKINSON

BY *Leonard Bloom*

ATTORNEY

United States Patent Office 3,067,584
Patented Dec. 11, 1962

3,067,584
SEALING RING MEANS FOR RECIPROCATING PISTON USED IN POWER-OPERATED PERCUSSIVE TOOL
George E. Atkinson, Linthicum Heights, Md., assignor to The Black and Decker Manufacturing Company, Towson, Md., a corporation of Maryland
Filed Feb. 15, 1962, Ser. No. 173,576
7 Claims. (Cl. 60—62.5)

The present invention relates to sealing ring means for a reciprocating piston that is used in a power-operated percussive tool, and more particularly, to such a power-operated percussive tool that has a momentary venting means for the air entrapped in a chamber formed between a floating ram and the reciprocating piston.

It is an object of the present invention to have a sealing ring loosely disposed in an external annular groove formed on the piston, wherein the ring has both an axial clearance and an internal radial clearance with respect to the groove formed on the piston, whereby an outward radial pressure is exerted radially intermediate of the piston and ring, and whereby a supplemental momentary venting of the entrapped air under pressure is accommodated at each end of reciprocation of the piston.

It is another object of the present invention to provide a primary momentary venting means for the air entrapped in the chamber formed between the piston and ram, the primary momentary venting means being operative intermediate the stroke of the reciprocating piston, in combination with a supplemental momentary venting means which is operative at each end of reciprocation of the piston.

It is a further object of the present invention to provide a resilient sealing ring for a reciprocating piston used in a power-operated percussive tool, wherein the ring is maintained in sealing engagement with the outer member by reason of a radial air pressure operative between the piston and the ring, such that when the outer annular surface of the ring wears over its life, the outward radial pressure on the sealing ring maintains the ring in continuous close engagement with the outer member, thereby maintaining a good sealing effect at all times.

In accordance with a preferred embodiment of the present invention, there is provided a power-operated percussive tool having a barrel and further having a floating ram reciprocating within the barrel. A piston is guided for reciprocation within the barrel. The piston and the ram have a chamber formed therebetween whereby air under pressure may be entrapped therein. Power-operated means are provided to reciprocate the piston. The air entrapped in the chamber exhibits alternate compression and suction effects to alternately accelerate and retract the ram, respectively, and suitable primary momentary venting means are provided for the air entrapped in the chamber. The piston has an external annular groove formed thereon. The groove has a given axial length measured axially of the piston, and the piston has a minimum diameter measured across the groove. A sealing ring is loosely disposed in the external annular groove and extends radially beyond the piston. The sealing ring has an axial length which is less than the axial length of the groove, and the sealing ring further has an innermost diameter which is greater than the minimum diameter of the piston measured across the groove. Consequently, air under pressure is received radially intermediate of the piston and the sealing ring so as to exert an outward radial force on the sealing ring, thereby maintaining the sealing ring in close sealing engagement. As the piston reciprocates, the sealing ring will be disposed against one side of the groove as the piston moves in one direction. As the piston reverses direction, however, the sealing ring will move axially to the other side of the groove. Thus, a supplemental momentary venting of a portion of air under pressure is accommodated upon a reversal in direction of motion of the reciprocating piston.

Not only are the alternate compression and suction effects of the entrapped air under pressure enhanced by reason of a superior seal, one that is motivated by means of a radial air pressure operative on the loose sealing ring, but moreover, a supplemental momentary venting means is available at each end of the stroke of the reciprocating piston, over and above the primary venting means which is operative intermediate the stroke of the piston, so as to render the percussive tool more efficient and smoother in operation, and more particularly, to enhance the cycling and idling of the floating ram.

These and other objects of the present invention will become apparent from a reading of the following specification, taken in conjunction with the enclosed drawings, in which:

FIGURE 2 is an enlarged portion of FIGURE 1, showing how the sealing ring has both an axial clearance and a radial clearance with respect to the piston;

FIGURE 3 is a view corresponding substantially to that of FIGURE 2, but showing the reciprocating piston telescopically received within the floating ram, such that the sealing ring is partially compressed yet still retains a radial clearance, as well as an axial clearance, with respect to the external annular groove formed on the piston;

FIGURE 4 illustrates how the sealing ring will move to one side of the external annular groove as the reciprocating piston moves axially in the direction shown by the large arrow, while the radial air pressure that is developed upon the loose sealing ring intermediate the ring and the piston is illustrated by the series of small arrows;

FIGURE 5 is a view corresponding to that of FIGURE 4, but showing how the sealing ring moves to the opposite side of the external annular groove whenever the reciprocating piston changes direction, thus accommodating a supplemental momentary venting of the entrapped air under pressure, as indicated by the small arrows;

FIGURE 6 shows how even a partially-worn sealing ring will nevertheless be maintained in close sealing engagement with the ram by means of the outward radial air pressure on the ring; and FIGURE 7 is a fragmentary sectional view taken across the lines 7—7 of FIGURE 2, showing in greater detail, the radial clearance between the sealing ring and the external annular groove formed on the piston.

Figure 1:
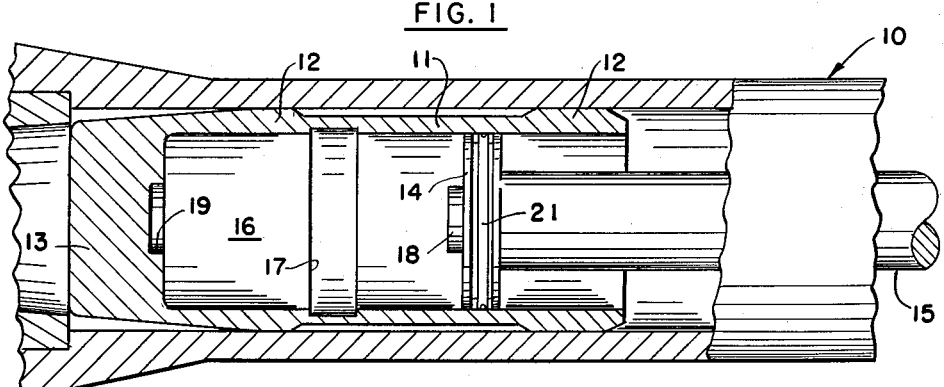
FIGURE 1 is a longitudinal sectional view of a portion of the power-operated percussive tool, showing the barrel of the tool, the floating ram reciprocating within the barrel, and the reciprocating piston guided within the barrel and having the sealing ring loosely disposed thereon.
Figure 1:
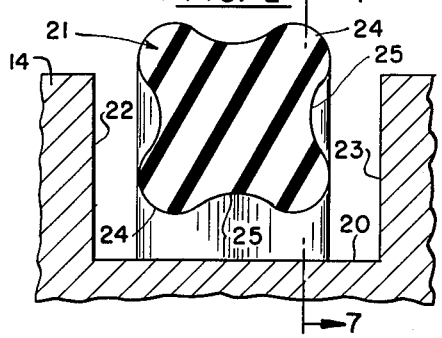
Figure 1:
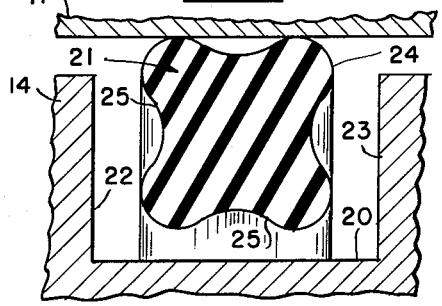
Figure 1:
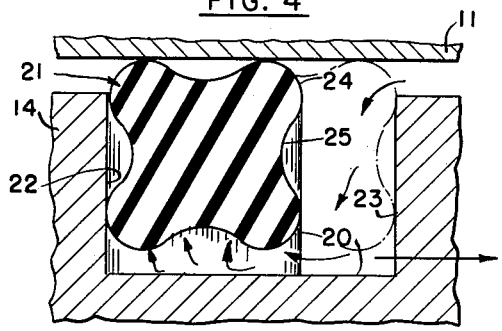
Figure 1:
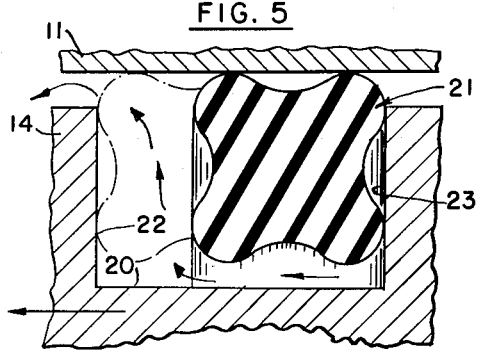
Figure 1:
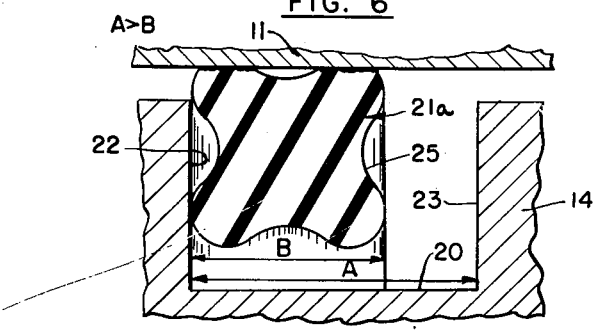
Figure 1:

With reference to FIGURE 1, there is illustrated a portion of a power-operated percussive tool, such as a portable electric hammer having a barrel 10. A floating ram 11 is guided for reciprocation within the barrel 10 by means of rails 12. The floating ram 11 comprises a hollow cylindrical member having a closed forward end 13. A piston 14 is guided for reciprocation within the barrel 10, and suitable power-operated means (not shown) are provided to reciprocate the piston 14. Preferably, but not necessarily, the piston 14 is telescopically received within the ram 11 and comprises a disc-shaped relatively-short member having an integral elongated piston rod 15. The piston 14 and the ram 11 have a chamber 16 formed therebetween, whereby air under pressure may be entrapped therein. The air entrapped in chamber 16 exhibits alternate compression and suction effects so as to alternately accelerate and retract the ram, respectively, and it will be appreciated that the piston 14 and ram 11 will normally reciprocate relatively, and not in unison, with respect to each other.

Suitable momentary venting means are provided to allow the mass of air entrapped in chamber 16 to adjust to a substantially constant working level during the operation of the percussive tool. A preferred form of such venting means comprises an internal annular recess 17 formed within the ram 11 and having an axial length which is greater than the axial height of the disc-shaped piston 14. Consequently, a primary momentary venting or valving of the air entrapped in chamber 16 is accommodated whenever the piston 14 passes by and is in communication with the recess 17 formed within the ram 11. The primary momentary venting means herein illustrated is described more particularly in the co-pending Akerman application Serial No. 18,178, filed March 28, 1960, entitled "Momentary Venting Means for Power-Operated Percussive Tool," and assigned to the same assignee as that of the present invention; but it will be appreciated that any suitable primary momentary venting means may be utilized in conjunction with the teachings of the present invention.

With further reference to FIGURE 1, the piston 14 has a forwardly-projecting protrusion 18, while the closed forward end 13 of the ram 11 has a cooperating recess 19. When the sealing ring (hereinafter to be described) has worn completely, such that it has very poor sealing engagement with the ram 11, there are times when the piston 14 may impact against or "bottom" against the closed forward end 13 of the ram 11. Should this condition persist, very heavy shock loads will be imparted to the piston 14, and via the piston 14 to the other working components of the percussive tool, thus precipitating a serious component failure in the tool. In order to preclude this possibility, the protrusion 18 is adapted to be received within the recess 19 and to acquire a press-fit therein upon the initial bottoming of the piston 14 and the ram 11. Consequently, the floating ram 11 is "caught" or mechanically coupled to the piston 14, and thereafter, the piston 14 and ram 11 will reciprocate in unison with each other, rather than relatively to each other. Such a ram catcher is described more particularly in the co-pending Atkinson application Serial No. 108,180, filed May 5, 1961, entitled "Ram Catcher for Piston-Ram Assembly," and assigned to the same assignee as that of the present invention; but again, it will be understood that the present invention is operative with or without the conjunctive usage of such ram catcher means.

With reference to FIGURES 2, 6, and 7, the piston 14 has an external annular groove 20 formed thereon, and a sealing ring 21 is loosely disposed in the groove 20. As shown in FIGURE 6, the external annular groove 20 has an axial length denoted by the dimension "A," while the sealing ring 21 has an axial length "B" which is less than the axial length "A" of the groove 20. Moreover, and with particular reference to FIGURE 7, the piston 14 has a minimum diameter "C" measured across the groove 20, while the sealing ring 21 has an innermost diameter "D" which is greater than the minimum diameter "C" of the piston 14. Thus, as shown in FIGURE 2, the ring 21 has both an axial clearance and a radial clearance with respect to the groove 20 formed on the piston 14.

With reference to FIGURE 3, as the piston 14 carrying the sealing ring 21 is received telescopically within the ram 11, the sealing ring 21 will be partially squeezed or compressed radially, but nevertheless, the sealing ring 21 still retains both an axial clearance and a radial clearance with respect to the external annular groove 20 formed on the piston 14. The external annular groove 20 preferably has a pair of parallel side walls 22 and 23. As the reciprocating piston 14 moves axially in one direction, as denoted by the arrow in FIGURE 4, the sealing ring 21 is disposed against the side wall 22 of the external annular groove 20. Moreover, as indicated by the additional small arrows in FIGURE 4, air under pressure is received radially between the ring 21 and the piston 14 so as to exert an outward radial pressure on the ring 21, thereby maintaining the ring 21 in close sealing engagement with the ram 11.

With reference to FIGURE 5, as the piston 14 reverses its direction of reciprocation, the sealing ring 21 moves axially to the opposite side wall 23 of the groove 20. Consequently, in this case, the air which had been received radially between the sealing ring 21 and the piston 14 may be admitted to the chamber 16. Conversely, at the opposite end of the stroke of the reciprocating piston 14, the air which had been received radially between the sealing ring 21 and the piston 14 may be released from communication with the chamber 16. Thus, there is provided a supplemental momentary venting of a portion of the entrapped air under pressure substantially at each end of reciprocation of the piston 14. This supplemental venting is in addition to the primary momentary venting hereinbefore described and is beneficial from the standpoint of providing smoother operation, a more efficient cycling of the ram 11, and a better "idling" whenever the conventional tool bit (not shown) has been removed from the percussive tool.

With reference, again, to FIGURES 2, 3, 4, and 5, the sealing ring 21 preferably, but not necessarily, comprises an annular resilient member whose cross-section includes four convex lobes 24, equally spaced from each other, and four concave recesses 25, one each intermediate a respective pair of lobs 24. Consequently, and for superior sealing effect, there is a "two point" annular line contact between the ring 21 and the ram 11, rather than a "single point" contact (as viewed in section) for the conventional O-ring. Such a sealing ring 21 is known in the art as a "quad" ring and is commercially available.

With reference to FIGURE 6, there is illustrated a sealing ring 21a which has two of its convex lobes 24 partially worn away or frayed. Nevertheless, because of the techniques of the present invention, more particularly the radial pressure which is exerted on the ring 21a, the ring 21a will maintain a fairly good sealing engagement with the ram 11 until such time that it is completely worn.

Obviously, many modifications may be made without departing from the basic spirit of the present invention; and therefore, within the scope of the appended claims, the invention may be practiced other than has been specifically described.

I claim:
1. In a percussive tool, the combination of:
   (a) a barrel;
   (b) a floating ram reciprocating within said barrel;
   (c) a piston guided for reciprocation within said barrel;
   (d) said piston and said ram having a chamber therebetween, whereby air may be entrapped therein;
   (e) power-operated means to reciprocate said piston, whereby the air entrapped in said chamber exhibits alternate compression and suction effects to alternately accelerate and retract said ram, respectively;
   (f) primary momentary venting means for the air entrapped in said chamber;
   (g) means forming an external annular groove on said piston;
   (h) said groove having a given axial length measured axially of said piston, and said piston having a minimum diameter measured across said groove; and
   (i) a sealing ring loosely disposed in said external annular groove of said piston and extending radially beyond said piston;
   (j) said sealing ring having an axial length which is less than said axial length of said groove; and
   (k) said sealing ring further having an innermost diameter which is greater than said minimum diameter of said piston measured across said groove, whereby air under pressure is received radially intermediate of said piston and said sealing ring to exert an outward radial force on said sealing ring, said sealing ring being disposed against one side of said groove as said reciprocating piston moves in one direction, and whereby as said piston reverses direction, said sealing ring moves axially to the other side of said groove, thereby providing for a supplemental momentary venting of air under pressure upon the reversal in direction of motion of said reciprocating piston.

2. The combination according to claim 1, wherein:
 (a) said external annular groove formed on said piston has a pair of parallel side walls.

3. The combination according to claim 1, wherein:
 (a) said ram comprises a hollow cylindrical member having a closed forward end; and wherein
 (b) said piston comprises a relatively-short disc-shaped member telescopically received within said hollow cylindrical ram member.

4. The combination according to claim 1, wherein said sealing ring comprises:
 (a) a resilient annular member having a square cross-section which includes four convex lobes, equally spaced from each other; and
 (b) said cross-section of said member further including four concave recesses, one each intermediate a respective pair of lobes.

5. In a percussive tool, the combination of:
 (a) a barrel;
 (b) a floating ram reciprocating within said barrel;
 (c) a piston guided for reciprocation within said barrel;
 (d) said piston and said ram having a chamber therebetween, whereby air under pressure may be entrapped therein;
 (e) power-operated means to reciprocate said piston, whereby the air entrapped in said chamber exhibits alternate compression and suction effects to alternately accelerate and retract said ram, respectively;
 (f) primary momentary venting means for the air entrapped in said chamber;
 (g) means forming an external annular groove on said piston;
 (h) a resilient sealing ring loosely disposed in said external annular groove of said piston and extending radially beyond said piston; and
 (i) means included in said piston for utilizing a portion of the entrapped air under pressure to exert an outward radial force on said sealing ring radially intermediate of said piston and said ring;
 (j) said last-named means accommodating a supplemental momentary venting of the entrapped air at the ends of reciprocation of said piston.

6. In a percussive tool, the combination of:
 (a) a floating ram reciprocating within the tool;
 (b) said ram comprising a hollow cylindrical member having a closed forward end;
 (c) a reciprocating piston telescopically received within said hollow cylindrical ram member;
 (d) said ram and said piston having a chamber therebetween, whereby air under pressure may be entrapped therein;
 (e) power-operated means to reciprocate said piston, whereby the air entrapped in said chamber exhibits alternate compression and suction effects to alternately accelerate and retract said ram, respectively;
 (f) primary momentary venting means for the air entrapped in said chamber;
 (g) means forming an external annular groove on said piston; and
 (h) a sealing ring loosely disposed in said external annular groove of said piston and extending radially beyond said piston in sealing engagement with said ram;
 (i) said sealing ring having both an axial clearance and a radial clearance with respect to said external annular groove on said piston, whereby an outward radial air pressure is exerted on said sealing ring intermediate said ring and said piston, and whereby a portion of the entrapped air under pressure may have a supplemental momentary venting substantially at each end of reciprocation of said piston.

7. In a percussive tool, the combination of:
 (a) a floating ram reciprocating within the tool;
 (b) said ram comprising a hollow cylindrical member having a closed forward end;
 (c) a reciprocating piston telescopically received within said hollow cylindrical ram member;
 (d) said ram and said piston having a chamber therebetween, whereby air under pressure may be entrapped therein;
 (e) power-operated means to reciprocate said piston, whereby the air entrapped in said chamber exhibits alternate compression and suction effects to alternately accelerate and retract said ram, respectively;
 (f) primary momentary venting means for the air entrapped in said chamber;
 (g) a sealing ring carried by said piston;
 (h) said sealing ring comprising a resilient annular member having a cross-section including four convex lobes, equally spaced from each other;
 (i) said cross-section of said member further including four concave recesses, one each intermediate a respective pair of lobes;
 (j) said four convex lobes including two lobes which extend radially beyond the remaining two lobes, whereby said first two lobes are in sealing engagement with said ram; and
 (k) means to exert an outward radial air pressure on said sealing ring to maintain said ring in close sealing engagement between said ram and said piston.

No references cited.